United States Patent [19]

Mohr

[11] 3,840,138

[45] Oct. 8, 1974

[54] METHOD AND APPARATUS FOR HEATING STRIPE-LIKE AREAS ON CAN BODIES

[75] Inventor: Glenn R. Mohr, Linthicum, Md.

[73] Assignee: Continental Can Company, Inc., New York, N.Y.

[22] Filed: Apr. 25, 1973

[21] Appl. No.: 354,350

[52] U.S. Cl............. 219/10.57, 219/9.5, 219/10.43, 219/10.53, 219/10.71, 219/10.79, 117/93.2
[51] Int. Cl. ............................................. H05b 5/08
[58] Field of Search.............. 219/8.5, 10.41, 10.43, 219/10.53, 10.57, 9.5, 10.71, 10.79, 10.49; 117/93.2, 93, 21; 118/641

[56] References Cited
UNITED STATES PATENTS

| | | | |
|---|---|---|---|
| 2,468,796 | 5/1949 | Wood et al.    | 219/10.43 |
| 2,818,483 | 12/1957 | Blume          | 219/8.5 X |
| 3,562,470 | 2/1971 | Bobart et al.  | 219/10.43 |
| 3,713,862 | 1/1973 | Winkless       | 117/21 X |
| 3,727,982 | 4/1973 | Itoh           | 219/10.57 UX |

Primary Examiner—Bruce A. Reynolds
Attorney, Agent, or Firm—Diller, Brown, Ramik & Wight

[57] ABSTRACT

This disclosure relates to the induction heating of stripe-like areas of can bodies under controlled conditions utilizing electrical energy on the order of 10 KHz and lower. The necessary heating is accomplished under very controlled conditions utilizing a plurality of separate coils.

51 Claims, 13 Drawing Figures

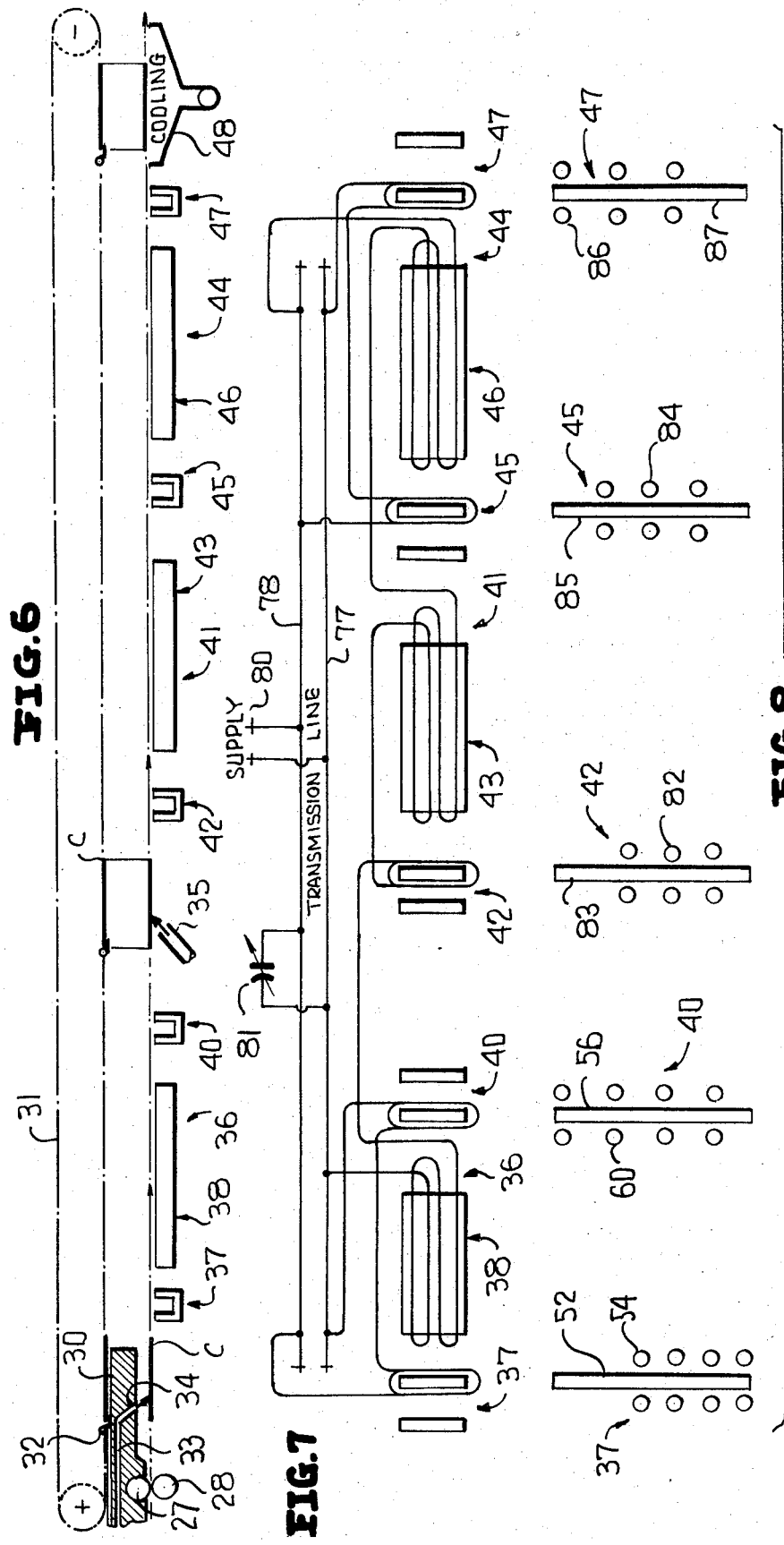

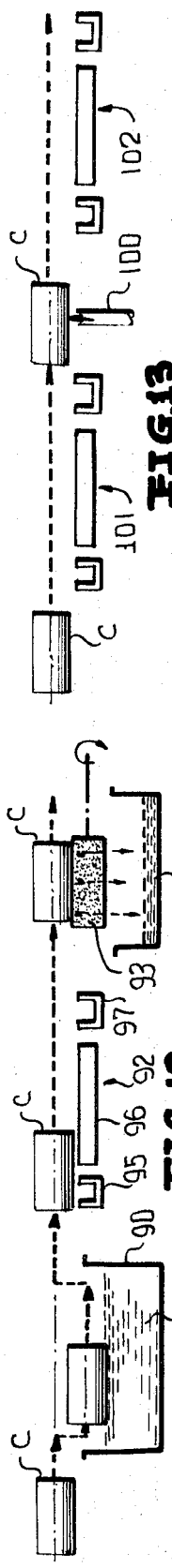

METHOD AND APPARATUS FOR HEATING STRIPE-LIKE AREAS ON CAN BODIES

This invention relates in general to the heating of stripe-like areas of moving can bodies particularly in alignment with side seams of such can bodies for the purpose of treating material applied to the side seam or areas thereof.

BACKGROUND OF THE INVENTION

At the present time can bodies are formed with welded side seams which necessitate the application of a stripe of material thereover to prevent oxidation and like deterioration of the side seam area. Such a side stripe may be applied to a can body by spraying the stripe material in liquid form. However, in the curing of such side stripe material noxious fumes are given off which are undesirable from the ecological standpoint.

The side stripe material has been applied in powder form with the necessary heating of the can body being performed by a gas burner system. This, however, is objectionable because of the resultant fumes from the gas burner from the ecological standpoint. Other disadvantages of gas burner heating are as follows:

A wide band of heat is required to cure the stripe material. As a result, discoloration of the adjacent previously applied lithographic decoration can occur. The gas supply in some locations may be restricted or non-available.

The lead end of a can body is often scorched. Burner heat adjustment from one burner to another is difficult and thus uniform heating is difficult to obtain.

Cooling fans or plant air drafts frequently blow the flame off the can body and causes cure variations.

The burner flames often have a high gas velocity which blows the exposed outside side stripe powder material away from the side seam.

In order to cure the inside side stripe, heat must flow through the outside stripe material and the can body unless the outside stripe material is located after the main gas burners. As a result, outside stripe deterioration can occur.

Burner maintenance is a problem in that the powdered side stripe material drops off of the can bodies and plugs the jets of the burners.

In view of the foregoing, it has been proposed to utilize high frequency electrical energy inductive heating of the can bodies. However, it has been found that utilizing the conventional split coil heater, uniform heating of a stripe-like area on a can body cannot be maintained at frequencies below 60 KHz. Such high frequency power use is highly undesirable from the standpoint of necessary shielding, the existence of much metal in the area of the can body transport, such as guide rails and feed chains and dogs, and the expensive equipment involved as well as the power loss.

It also has been found that applying solder to a soldered can body side seam presents a problem when no gas is available to pre-heat and maintain the temperature of a can body side seam. While the molten solder may be readily applied to the side seam, the excess solder hardens and cannot be sufficiently wiped from the can body if the temperature of the can body is not maintained to a point where the solder remains slightly molten so that it may be brushed off.

SUMMARY OF THE INVENTION

In accordance with this invention, it is proposed to provide a coil arrangement which will induce electrical energy into can bodies so as to provide for the necessary heating of a stripe-like area on each can body for the intended purpose, such as melting and then curing a thermoplastic powdered side stripe material, or maintaining the necessary temperature of the can body and solder applied thereto until efficient wiping of the can body can occur. Further, it is proposed that the coil arrangement be such that the necessary heating will occur with a maximum frequency on the order of 10 KHz.

The simplest way of inductance heating of a stripe-like area along a can body is by means of a split coil. However, when the frequency of the electrical energy supplied the coil is below 60 KHz, at the leading and trailing ends of the can body, the two lines of flux are split with the result that the induced current is divided into two paths at the end portions of the can body. Since induced heating is directly based upon the formula $I^2R$, the heating at the end portions of a can body is only one quarter of the heating in the central area of the can body. Therefore, in order to maintain the desired temperature along the stripe-like area of the can body for a major portion thereof at a predetermined temperature, the end portions must necessarily be at a reduced and insufficient temperature. Therefore, it is a primary feature of this invention to provide additional coil arrangements which will produce a primary heating in the end portions of each can body which supplements the primary heating of the can body by the split coil so as to provide for a substantially uniform heating throughout the length of the can body.

Another feature of the present coil system is that the coils may be arranged in a plurality of series either to maintain the temperature of the can body area being heated or to increase the temperature thereof at a particular time interval so as to produce a necessary curing of thermoplastic material after the material, which was applied in powdered form, has had an opportunity to melt, to wet the surface of the can body and for the individual components thereof, to intermix.

A further feature of the invention is that the coil arrangement may be such as to provide the necessary heating of a can body along a stripe-like area thereof within predetermined confinements and at such a temperature as is necessary for the particular process with there being a substantially uniform heating throughout the length of the heated area.

With the above and other objects in view that will hereinafter appear, the nature of the invention will be more clearly understood by reference to the following detailed description, the appended claims and the several views illustrated in the accompanying drawings:

In the drawings:

FIG. 1 is a schematic showing of a can body having represented thereon a uniformly heated longitudinally extending stripe-like area as may be desired.

FIG. 2 is a schematic view similar to FIG. 1 and shows diagrammatically the heating of the end portions of a can body in a first heating operation.

FIG. 3 is a view similar to FIG. 2 and shows diagrammatically the heating of the can body in a separate heating operation.

FIG. 4 is another view similar to FIG. 2 and shows diagrammatically the heating of the can body in a third heating operation.

FIG. 5 is a further view similar to FIG. 2 showing schematically the combined results of the heating operations of FIGS. 2, 3 and 4.

FIG. 6 is a schematic side elevational view, with parts shown in section, of a welded side seam can body line having side stripe material applied to the side seam area both internally and externally with the can body being further heated to effect melting and curing of the side stripe material by induction heating coils in accordance with this invention.

FIG. 7 is a wiring schematic showing the coupling of the various windings of the coils of FIG. 6.

FIG. 8 is a schematic view showing the arrangement of windings on pole pieces of certain of the heating coils.

FIG. 9 is an enlarged plan view of one series of heating coils and there respective windings.

FIG. 10 is an enlarged fragmentary sectional view taken along the line 10—10 of FIG. 9 and shows the details of one of the heating coils.

FIG. 11 is an enlarged elevational view taken along the line 11—11 of FIG. 9 and shows the details of a typical U-shaped heating coil and the windings thereof.

FIG. 12 is a schematic side elevational view of a side seam soldering system in accordance with this invention.

FIG. 13 is a schematic side elevational view of another soldering system in accordance with this invention.

Referring now to the drawings in detail, it will be seen that there is illustrated in FIG. 1 a conventional can body C having a heated stripe-like area identified by the numeral 20. The schematically illustrated heated area 20 is of a uniform width indicative that there is a uniform heating of the area 20 throughout the length of the can body C. This is the desired uniform temperature heating which is difficult with gas burners and not heretofore possible with inductive heating at a low frequency on the order of 10 KHz and below.

Referring now to FIG. 3, it will be seen that with the most efficient split coil heater, it is not possible to heat a stripe-like area of a can body to a substantially uniform temperature throughout the length thereof. With a split coil operating at a frequency less than 60 KHz, the induced current is split at the leading and trailing edges of the can body with the result that the heating of the can body at the leading and trailing edges thereof is reduced directly proportional to the square of the reduced induced current. The net result is that there is very little effective heating of the stripe-like area at the ends of the can body as indicated by the heat pattern 21.

In order to compensate for the reduced or non-heating of the stripe-like area at the ends of the can body C, it is proposed to supplement the usual split coil with U-shaped coils which will effectively heat end portions of a can body along a predetermined width but which will produce only relatively small heating in other areas of the can body. With reference to FIG. 2, it will be seen that the can body C has thereon adjacent the leading and trailing edges thereof heat patterns 22 and 23, respectively, indicative substantially of the heating pattern with it being understood that the U-shaped coil will produce heating throughout the length of the can body, but to a much lesser degree.

Reference is next made to FIG. 4 wherein the heating of the leading and trailing edge portions only of the can body C is effected by means of a second U-shaped coil disposed downstream of the split coil heater. It is to be noted that heat patterns similar to those shown in FIG. 2 are formed. It is to be understood, however, that the heat patterns produced by the second U-shaped coil may be different from those produced by the first U-shaped coil. The heat patterns at the leading and trailing edges of the can body of FIG. 4 are identified by the numerals 24 and 25, respectively.

Referring now to FIG. 5, it will be seen that there is illustrated a can body C having diagrammatically shown thereon a heat pattern 26 which is a combination of the heat patterns 21 through 25. It is to be understood that through this composite heating of the can body C along a stripe-like area thereof, the temperature of the heated area may range generally between 400°F and 600°F with the maximum temperature differential being no larger than 50°F.

Reference is now made to FIG. 6 wherein there is schematically illustrated a practical adaptation of the invention. Can bodies C are provided with a welded side seam (not shown) which are to be covered both internally and externally of the can body by the application of internal and external side stripes. The can body C is welded by means of a pair of welding rolls 27, 28 of which the welding roll 27 is carried by a horn 30 which is supported in cantilevered relation and which, in turn, supports the can bodies C during the formation of the welded seams thereof.

It is to be understood that when the can bodies exit off of the horn 30, they will be received by suitable guides (not shown) for movement along a predetermined path. In order to effect movement of the can bodies along this predetermined path and through the guides, there is provided an endless conveyor 31 having a plurality of lugs 32 uniformly spaced therealong for engaging trailing ends of can bodies.

It is to be understood that the internal side stripe may be applied to the can body C in any desired manner, but the most convenient way is by means of a passage 33 through the horn with the passage 33 terminating in a suitable nozzle 34 which will apply the side stripe material in a stripe pattern of uniform width. The side stripe material is preferably in the form of a thermoplastic material having a melting point between 300°F and 400°F and a curing or cross linking point on the order of 600°F. The side stripe material is preferably applied to a can body in powder form by an electrostatic spraying process.

It is preferred that the internal side stripe material be applied to the can body first so that it may be initially heated through the application of external heat to the can body without affecting the side stripe material applied to the external surface of the can body. The external side strip material is applied through a nozzle 35 preferably by means of an electrostatic application principle.

It is to be understood that when the seam of the can body is welded, the temperature of the can body in the area of the seam is about 1,800°F. As the can body moves along the predetermined path, the seam cools. At the time the internal side stripe material is applied to the can body, the seam temperature is about 600°F.

As the powdered material melts, it absorbs heat and cools the seam to a temperature of between 300°F and 350°F depending on the line speed, that is the speed of movement of the can bodies.

It is to be understood that although initial melting of the internal side stripe material may occur due to the heat of the welded seam, it is necessary that the seam area of the can body be heated so that the temperature of the melted stripe material may be maintained between 300°F and 400°F depending on the line speed and the particular thermoplastic material which is utilized in forming the internal side stripe. It is to be understood that this elevated temperature should be maintained for a period on or about 2 seconds to allow the melted powder to flow and wet the surface of the can body and mix the constituents of the side stripe material. To this end, there is provided a first series of heaters which are generally identified by the numeral 36 and includes a first U-shaped heating coil 37 followed by an elongated split return type heating coil 38 and finally a second U-shaped heating coil 40.

It is to be understood that the details of the heating coils 37,38 and 40 will be set forth more specifically hereinafter. It is to be understood, however, that the heating coil 37 will produce the heat patterns 22 and 23 of FIG. 2. The heating coil 38 will produce the heat pattern 21 of FIG. 3. Finally, the heating coil 40 will produce the heat patterns 24 and 25 of FIG. 4 and that the combined heating effect of the series of heaters 36 is the heat pattern 26 schematically illustrated in FIG. 5.

It is to be noted that the spray nozzle 35 is disposed downstream of the series of heaters 36 and therefore, when the powdered external side stripe material is applied to the can body C, the stripe-like area adjacent the welded side seam is heated to a temperature of between 300°F and 400°F, which temperature is sufficient to effect melting of the powdered external side stripe material.

Downstream of the nozzle 35 for applying the exterior side stripe material is a second series of heaters generally identified by the numeral 41. The series of heaters 41 includes a U-shaped heater 42 for producing a heating effect similar to that schematically shown in FIG. 2, and a split return elongated coil 43. In the specific application of the invention, the series of heaters 41 does not include a second U-shaped coil downstream of the split elongated coil 43. However, it is to be understood that in some installations, such a coil would be provided.

It is to be understood that although the series of heaters 41 directly oppose the outer side stripe material, no undue heating of the outer side stripe material occurs in that all heating of the can body results from electrical energy induced into the can body with the heating being generally throughout the thickness of the relatively thin can body wall. It is to be understood that the series of heaters 41 is so constructed whereby the external side stripe material, which is also supplied in powdered form, has sufficient time within which to melt, wet the surface of the can body and the powdered components thereof mixed together.

Following the series of heaters 41, there is another series of heaters 44. The series of heaters 44 includes a U-shaped coil 45, an elongated split return coil 46 and a second U-shaped coil 47. The series of heaters 44 is specifically designed to raise the temperature of the selected stripe-like area of the can body to a temperature on the order of 600°F and to maintain that temperature for a sufficient length of time to permit cross linking of the molecular change of the thermoplastic side stripe material and thus complete curing of the side stripe material applied both internally and externally.

Following the series of heaters 44, it is frequently desirable to immediately cool down the can body and the cured side stripe material. Accordingly, suitable cooling means 48 may be provided downstream of the series of heaters 44.

Reference is now made to FIGS. 9, 10 and 11 wherein the specific details of the series of heaters 38 are illustrated. The coil 37 includes a base 50 and a pair of upstanding legs 51, 52 which are spaced longitudinally of the path of can body movement. The upper ends of the legs 51, 52 are provided with transversely arcuate recesses 53 which permit the upper ends of the legs 51, 52 to be disposed closely adjacent the path of movement of can bodies.

The base 50 and the legs 51, 52 form a core of the coil 37 and are formed of ferrite with a typical suitable ferrite being Cera Mag. 23B made by Stackpole Carbon Co.

The leg 52 has thereon a winding 54 in the form of a plurality of turns, generally on the order of 3 or 4, with the winding 54 being disposed vertically on the leg 52 in accordance with the desired intensity of heating. The winding 54 is preferably formed from copper tubing and in the form of the invention reduced to practice, the copper tubing was one quarter inch copper tubing.

The coil 40 is of a construction similar to that of the coil 37 and includes a generally U-shaped core which is formed of ferrite and includes a base 55 and upstanding legs 56, 57. The upper ends of the legs 56, 57 are recessed as at 58 to provide clearance for can bodies passing closely adjacent thereto. The leg 56 has a winding 60 thereon which, like the winding 54, is formed of copper tubing and includes a number of turns, generally 3 or 4 spaced vertically thereon.

It is also to be noted that the windings 54 and 60 are connected in series. Further, it is to be noted that the windings 54 and 60 are positioned on the legs of their respective cores which are nearest the coil 38. This is primarily as a matter of convenience so as to hold the length of the tubing connecting together the windings 54, 60 to a minimum. If desired, the winding 54 could be placed on the leg 51 or the winding 60 could be placed on the leg 57.

Referring now particularly to FIGS. 9 and 10, it will be seen that the coil 38 includes a pair of end blocks 61 which are connected together by an elongated plate 62. Further, there is secured to the underside of the plate 62 adjacent to, but spaced inwardly of each end block 61, a support leg 63. The end blocks 61, the plate 62 and the supports 63 are all formed of a suitable insulating material.

Extending between upper portions of the end blocks 61 is a further plate 64 which is slightly narrower than the plate 62. Seated on the plate, which is formed of ferrite, is an elongated ferrite strip 65. The upper surfaces of the strip 65 slope towards one another so as to generally match the contour of a can body and thus permit a can body to pass closely adjacent the same. The central part of strip 65 is recessed and is divided into two notches or seats 68 by an upstanding insulating strip 66.

It is to be noted that the end blocks 61 are provided with notches 67 in the upper edges thereof immediately adjacent the strip 65. A winding, generally identified by the numeral 70, is carried by the end blocks 61 and the strip 65 with the plate 64 and the strip 65 functioning as the core for such winding.

It is to be noted that the winding 70 includes a first elongated conductor portion 71, which is seated in one of the notches 68 and which is connected to a lead 72 for the winding. The conductor portion 71 is connected to a conductor portion 73 which is disposed at the side of the ferrite strip 65 adjacent the conductor portion 71. A third elongated conductor portion 74 is positioned in the notch 68 on the other side of the insulation strip 66 from the conductor portion 71 and it is to be noted that current flow in the conductor portions 71 and 74 is in the same direction. The conductor portion 74 is connected to a fourth elongated conductor portion 75 which is seated in the notches 67 formed in the end blocks 64 and which is disposed on the opposite side of the ferrite strip 65 from the conductor portion 73. The conductor portion 75 is also connected to a lead 76 with the leads 72 and 76 connecting the windings 70 to a source of electrical energy separate and apart from the windings 54 and 60.

At this time it is pointed out that each of the coils 37, 38 and 40 may be suitably potted.

Returning now to FIG. 7, it will be seen that the wiring for the various series of heaters includes transmission lines 77, 78 which are coupled to a suitable supply of high frequency electrical energy, the supply being identified by the numeral 80 and being capable of supplying electrical energy at a frequency on the order of 3 to 10 KHz. It is to be noted that the windings of the coils 37, 40, which are connected in series, are separately connected to the transmission lines 77, 78. In the same manner, the windings of the coils 45, 47 are coupled in series and are separately connected to the transmission line. On the other hand, the windings of the coils 38, 42, 43 and 46 are connected in series and are separately connected to the transmission lines 77, 78. It is to be understood that this is the preferred embodiment of the invention, although changes may be made in the coupling of the windings to the transmission lines.

There is also coupled to the transmission lines 77, 78 tunable capacitor means 81 with sufficient capacity to tune the combination shown in FIG. 7 to unity power factor at 9.6 KHz.

It has been previously indicated that the windings of the various coils are formed of copper tubing. It is also preferred that the transmission lines 77, 78 be formed of copper tubing cooled bus bars and water will be circulated through the various copper tubing in order to maintain the temperature of such conductors at a predetermined maximum.

Referring now to FIG. 8, it will be seen that there is illustrated the preferred details of the windings of the coils 37, 40, 42, 45 and 47. The coils 37 and 40 each include four turns in their respective winding with the winding 54 being disposed at the lower portion of the leg 52 carrying the same whereas the winding 60 is disposed on the upper portion of the leg 56 supporting the same.

With respect to the coil 42, it will be seen that the winding 82 thereof includes only three turns and is mounted on the lower portion of the associated core leg 83.

With respect to the coil 45, it will be seen that the winding 84 thereof is also a three turn winding and is mounted generally centrally on the associated leg 85 of the supporting U-shaped core. On the other hand, while the winding 86 of the coil 47 is also a three turn winding, it is mounted on the upper end of the associated leg 87 of the supporting U-shaped core.

It is to be understood that by varying the number of turns in the windings and the position of the winding on the respective supporting leg, the coils 37, 40, 42, 45 and 47 may be adjusted to produce different heating of can bodies passing thereover. It is also to be understood by varying the spacing of the coils 38, 43 and 46 from the path of travel of the can bodies, different heating intensity may be obtained.

At this time it is also pointed out that with the heating coils 38, 43 and 46, electrical current is induced into the can bodies transversely of the side seam and the width of heating is directly controlled by the spacing of the adjacent centrally located conductor portions. With the heating coils 37, 40, 42, 45 and 47, induced current into the can body flows axially of the can bodies and the width of heating is controlled by the coil design.

Although the heaters have been specifically illustrated and described in conjunction with the melting and curing of a thermoplastic side stripe material, it is to be understood that the heaters may have other usages. Accordingly, reference is now made to FIG. 12 wherein there is schematically illustrated a solder line for soldering side seams of can bodies. A solder pot 90 having molten solder 91 therein is positioned along the path of travel of can bodies C and solder is applied to the side seam area of a can body either by wiping the can body along the upper surface of the solder within the pot 90, or by means of a conventional solder applying roll (not shown). In any event, excess solder is applied to the can body and this excess solder must be wiped or brushed therefrom. However, normally after the can body has passed from the solder pot 90, the solder has set to the extent that it cannot be readily wiped therefrom. It is, therefore, necessary to maintain the temperature of the solder such that the excess solder may be subsequently wiped therefrom. For this purpose there is provided a heater unit 92. The heater unit 92 is an induction type heater and induces electrical energy into the metal can body C and heats the can body only in the area wherein solder has been applied thereto. Thus, the heater 92 maintains the necessary temperature of the solder on the can body so that excess solder may be readily wiped therefrom.

After the can body passes the heater assembly 92, it is engaged by a suitable wiper which is illustrated as a rotating wiper 93 with wiped solder being generally collected in a collector 94.

It is to be understood that the necessary heating of the solder which is accomplished by the heater assembly 92 could be performed by means of gas heaters. However, gas heaters directly apply the heat to the solder and thus are difficult to control. Further, frequently the soldered side seam can bodies are decorated in advance of forming the side seams so that the application of the gas flame undesirably deteriorates such decorative coating. In addition, there are many areas throughout the world where gas for heating purposes is not readily available.

It is to be understood that the heater assembly 92 will operate on relatively low frequency electrical energy such as 3 to 10 KHz. Further, it is to be understood that the heater assembly 92 may be similar to the series of heaters 36 and thus include a U-shaped coil 95, a split return coil 96 and another U-shaped coil 97, or any combination thereof. It is also to be understood that a similar type of low frequency heater may be utilized for heating the solder 91 in the solder pot 90 so that the same source of electrical energy may be utilized for the heater for the solder pot 90 and the heater assembly 92.

It is also envisioned that solder may be applied to the can body side seam either in liquid or powdered form by means of a suitable spray pipe 100. The can bodies C are moved along a predetermined path and it is preferable that in advance of the application of the solder, the can body in the area of the side seam be heated by means of a heater assembly 101. Further, it is necessary that the can body in the area of the side seam be heated under controlled conditions by means of a heater assembly 102. The heater assemblies 101 and 102 will be similar to the series of heaters 36 and will be supplied with low frequency electrical energy on the order of 3 to 10 KHz. It is to be understood that the heater assembly 101 will bring the can body up to the desired temperature along a narrow stripe-like area aligned with the side seam thereof and that the heater assembly 102 will heat the same area sufficiently to either melt or maintain the melted condition of the solder for sufficient time for it to wet the can body in all areas of the side seam.

It is also to be understood that the soldering line of FIG. 13 may be provided with a wiper of the type illustrated in FIG. 12.

It is also envisioned that solder could be applied to the can body blank and that the heater assemblies 101 and 102, or only one thereof, may be utilized for the purpose of melting such solder to form the desired soldered side seam.

Although only several preferred embodiments of the invention have been specifically described and illustrated herein, it is to be understood that minor variations may be made in the heater construction and applications thereof, without departing from the spirit and scope of the invention, as defined by the appended claims.

I claim:

1. A method of substantially uniformly heating a longitudinally moving member of a finite length along a longitudinally extending stripe-like area, said method comprising the steps of heating primarily along leading and trailing end portions thereof, and separately heating the member along the stripe-like area substantially between the end portions thereof.

2. The method of claim 1 wherein the heating of each of the end portions occurs separate and apart from one another.

3. The method of claim 2 wherein the heating of the members occurs sequentially starting at one end of the member.

4. The method of claim 1 wherein the heating pattern of each of the heated end portions is one wherein maximum heating occurs at the respective terminal end of the member and said heating reduces to minimum approaching zero spaced from the respective terminal end.

5. The method of claim 4 wherein the heating pattern effected by the separately heating of the member is one of substantially constant temperature for the major portion thereof and reducing to a minimum approaching zero adjacent the terminal ends of the member.

6. The method of claim 5 wherein areas of reduced heating by the several heating steps overlap and compensate to provide the substantially uniform heating.

7. The method of claim 1 wherein the member is a tubular member.

8. The method of claim 1 wherein the member is a can body.

9. The method of claim 1 wherein the member is a can body and a stripe of material to be processed is applied to the can body over the stripe-like area.

10. The method of claim 9 wherein the material of the stripe of material is a thermoplastic, and there is a like final heating of the can body to effect curing of the applied stripe of material.

11. The method of claim 10 wherein the thermoplastic material is applied as a powder and initial heating of the can body effects melting of the thermoplastic material and the final heating effects a cross linking of molecular chains of the thermoplastic material.

12. The method of claim 11 wherein the can body has a welded seam, the stripe-like area extends along the welded seam, and the stripe of material is applied to the can body while the stripe-like area remains heated from the welding and provides for said initial heating.

13. The method of claim 9 wherein the material of the stripe of material is a thermoplastic and is applied to the can body as a powder with the heating of the can body being sufficient to effect melting and curing of the thermoplastic material.

14. The method of claim 9 wherein the can body has a welded side seam, the stripe-like area is along the welded seam, the stripe of material is applied while the stripelike area remains heated, and the heating steps are subsequently performed.

15. The method of claim 14 wherein the material of the strip of material is a thermoplastic and is applied to the can body as a powder with the heating of the can body being sufficient to effect melting and curing of the thermoplastic material.

16. The method of claim 1 wherein the member is a can body and a stripe of material to be processed is applied to the can body over the stripe-like area both externally and internally.

17. The method of claim 16 wherein the heating steps are repeated and at least one of the stripes of material is applied to the can body intermediate heatings of the can body.

18. The method of claim 16 wherein the heating steps are repeated and there is a heating of the can body both prior to and subsequent to each application of a stripe of material.

19. The method of claim 18 wherein the material of the stripes of material is a thermoplastic, and there is a like final heating of the can body to effect curing of the applied stripes of material.

20. The method of claim 19 wherein the thermoplastic material is applied as a powder and initial heating of the can body effects melting of the thermoplastic material and the final heating effects a cross linking of molecular chains of the thermoplastic material.

21. The method of claim 20 wherein the can body has a welded seam, the stripe-like area extends along the welded seam, and a first of the stripes of material is applied to the can body while the stripe-like area remains heated from the welding and provides for said initial heating.

22. The method of claim 1 wherein the heating is effected by passing the member through separate fields of electrical energy.

23. The method of claim 22 wherein the electrical energy is low frequency electrical energy ranging from 3 to 10 KHz.

24. The method of claim 1 wherein the heating is effected by passing the member through separate fields of electrical energy produced by separate coils.

25. An apparatus for substantially uniformly heating a member of a finite length along a longitudinally extending stripe-like area comprising means for moving the member uniformly along a longitudinal path, and a series of heater means for separately heating the stripe-like area of a moving member, said series of heater means including first heater means for heating a member along the stripe-like area thereof to a desired temperature primarily along leading and trailing end portions thereof, and second heater means for separately heating the member to the desired temperature entirely along the stripe-like area except for there being a minimal heating of the end portions thereof.

26. The apparatus of claim 25 wherein said first heater means include two separate heater means for separately heating the leading end portion and the trailing end portion.

27. The apparatus of claim 26 wherein said separate heater means are disposed on opposite sides of said second heater means along said path.

28. The apparatus of claim 26 wherein said separate heater means are of a different design from said second heater means.

29. The apparatus of claim 28 wherein said second heater means includes longitudinally elongated coils having longitudinal segments disposed parallel to said path in substantially centered relation thereto.

30. The apparatus of claim 29 wherein there are a plurality of said series of heater means and all of said second heater means are coupled in series.

31. The apparatus of claim 26 wherein each separate heater means includes a U-shaped core having two legs opposing said path and having an energizable winding on one leg only.

32. The apparatus of claim 31 wherein the cores of the two separate heater means are like oriented and the windings are on different respective legs.

33. The apparatus of claim 31 wherein the windings of the two separate heater means are coupled in series.

34. The apparatus of claim 31 wherein there are two of said series of heater means, and the first heater means of the two series of heater means are different to produce different heating results.

35. The apparatus of claim 34 wherein the windings of one of said first heater means are closer to said path than the windings of the other of said first heater means.

36. The apparatus of claim 34 wherein the windings of one of said first heater means are closer to said path than the windings of the other of said first heater means, and the number of windings of said one first heater means is less than the number of windings of said other first heater means.

37. The apparatus of claim 25 wherein the apparatus is particularly adapted for applying a side seam stripe to a can body and includes stripe material applying means, and said series of heater means are particularly adapted to process said stripe material.

38. The apparatus of claim 37 wherein said stripe material applying means is of the type for applying powdered material.

39. The apparatus of claim 37 wherein said series of heater means are operable to effect melting of applied stripe material.

40. The apparatus of claim 37 wherein said apparatus includes means for welding said side seam in advance of said series of heater means.

41. The apparatus of claim 40 wherein said stripe material applying means are disposed adjacent said welding means whereby a seam area of a can body is still at an elevated temperature when the stripe material is applied thereto.

42. The apparatus of claim 40 wherein said stripe material applying means are disposed in advance of said series of heater means.

43. The apparatus of claim 42 wherein there are a plurality of said series of heater means, and there is a second means for applying a second stripe forming material to a can body intermediate two of said series of heater means, one stripe material applying means being of the type for applying an internal stripe and the other stripe material applying means being of the type for applying an external stripe.

44. The apparatus of claim 25 wherein the moving means are particularly adapted for conveying can bodies of the type having a longitudinal seam, said apparatus including means for applying a meltable material to said side seam, and said series of heater means are operable to melt applied material along said seam.

45. The apparatus of claim 25 wherein each heater means is in the form of a ferrite filled coil.

46. The apparatus of claim 25 wherein each heater means is in the form of a coil energized by a low frequency current on the order of 3 to 10 KHz.

47. A method of curing on a can body a side stripe of thermoplastic material applied in powdered form comprising the steps of inductively heating the can body in the area of the side stripe to a temperature sufficient to effect melting of the thermoplastic material utilizing low frequency electrical energy, generally maintaining the temperature for a time sufficient to allow the melted material to flow and wet the underlying can body surface with there being a mixing of the powdered constituent thereof, and thereafter inductively heating the can body in the area of the side stripe to a temperature to effect cross linking of the thermoplastic material utilizing low frequency electrical energy.

48. The method of claim 47 wherein the frequency of the electrical energy is maintained substantially between 3 and 10 KHz.

49. The method of claim 48 wherein end portions of the can body in the area of the side stripe are heated separately from the remainder of the area.

50. The method of claim 47 wherein the can body is heated prior to the application of the stripe material.

51. The method of claim 50 wherein the can body has a side seam, the stripe material is applied over the side seam, and the can body is prior heated along the side seam during the formation thereof.

* * * * *